June 30, 1953 T. A. JONES 2,644,036

RECEIVER FOR TWO-TONE CARRIER SYSTEMS

Filed Aug. 29, 1950 2 Sheets-Sheet 1

INVENTOR
T. A. JONES
BY H. A. Burgess
ATTORNEY

June 30, 1953 T. A. JONES 2,644,036

RECEIVER FOR TWO-TONE CARRIER SYSTEMS

Filed Aug. 29, 1950 2 Sheets-Sheet 2

INVENTOR
T. A. JONES
BY H. A. Burgess
ATTORNEY

Patented June 30, 1953

2,644,036

UNITED STATES PATENT OFFICE 2,644,036

RECEIVER FOR TWO-TONE CARRIER SYSTEMS

Theodore A. Jones, Tenafly, N. J., assignor to Bell Telephone Laboratories, Incorporated, New York, N. Y., a corporation of New York Application August 29, 1950, Serial No. 181,951

6 Claims. (Cl. 178—66)

This invention relates to carrier telegraph and more particularly to transmitting and receiving circuits for a carrier telegraph system employing different frequencies for marking and spacing signals.

It is an object of this invention to convert received two-tone carrier telegraph signals into neutral or on-off signals.

It is a further object of the invention to provide receiving circuits for a two-tone telegraph system which may easily be converted into a single-tone system having twice as may channels as the two-tone system.

In accordance with an illustrative embodiment of the invention to be described later in detail, two-tone carrier telegraph signals are transmitted by interconnecting two sending modulators in a single loop with a sending device. The modulators are inverted with respect to each other so that a marking signal in the sending loop will cause one modulator to release a tone of marking frequency while the other modulator is cut off. A spacing signal in the sending loop will cut off the marking modulator and cause the spacing modulator of the interconnected pair to send a tone of the spacing frequency.

At the receiver the outputs of the receiving filters which select the marking and spacing frequencies are connected through a common current limiter to means for separately rectifying and filtering the marking and spacing signals. The outputs of the latter filtering means are connected in series opposing in the grid-cathode circuit of an output tube, together with enough negative bias to result in half the normal marking load current in the absence of input signals. When a marking signal is received, the output of the marking filter overcomes the grid bias resulting in full output current and when a spacing signal is received, the output of the spacing filter has the same polarity as the negative grid bias, causing the tube to be cut off.

A feature of the invention is that both the sending and receiving circuits may be readily converted into single-tone channels, one for the spacing frequency and one for the marking frequency. At the transmitter it is necessary merely to eliminate the interconnections of the sending modulators and to connect separate sending devices to each of the modulators. At the receiver it is necessary only to provide a separate output device for each of the channel low-pass filters. Another feature of the invention is that neutral or on-off output signals may readily be obtained at the receiver in addition to retaining the advantages of polar operation over the carrier line.

Figure 1:
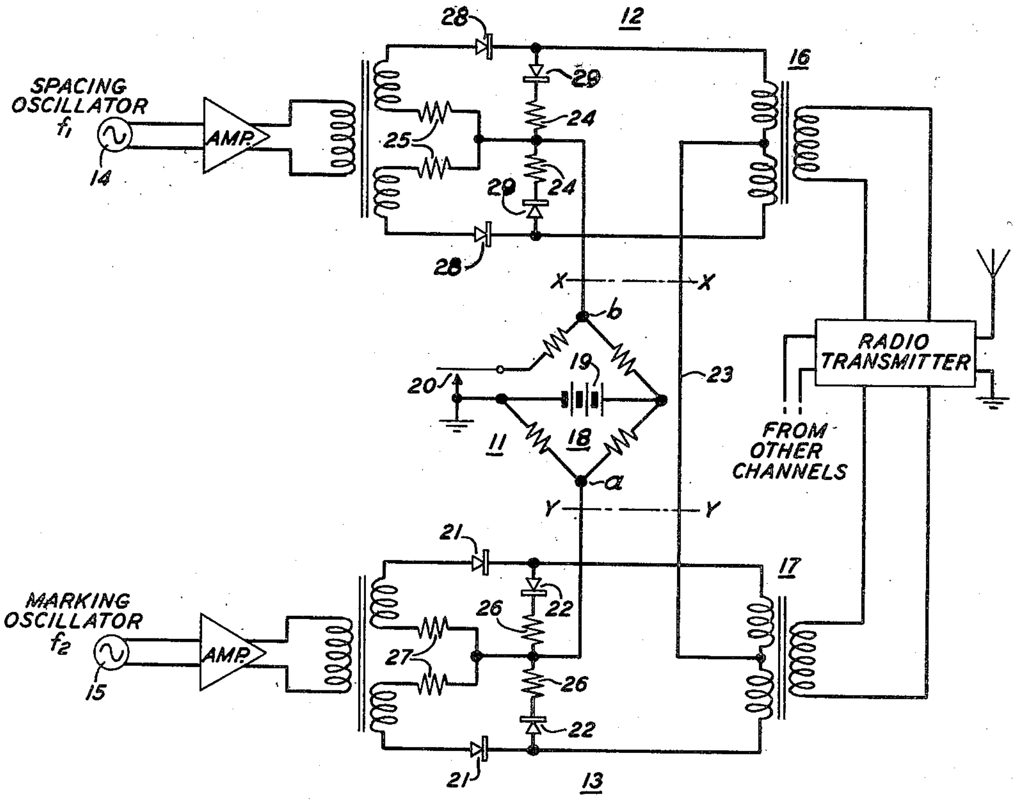
Figure 1A:
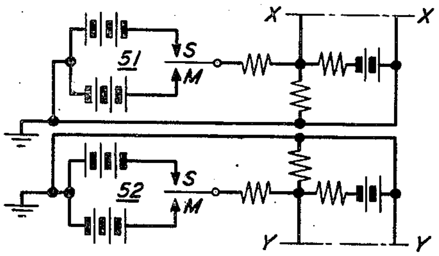
Figures 2, 2A, 2B:
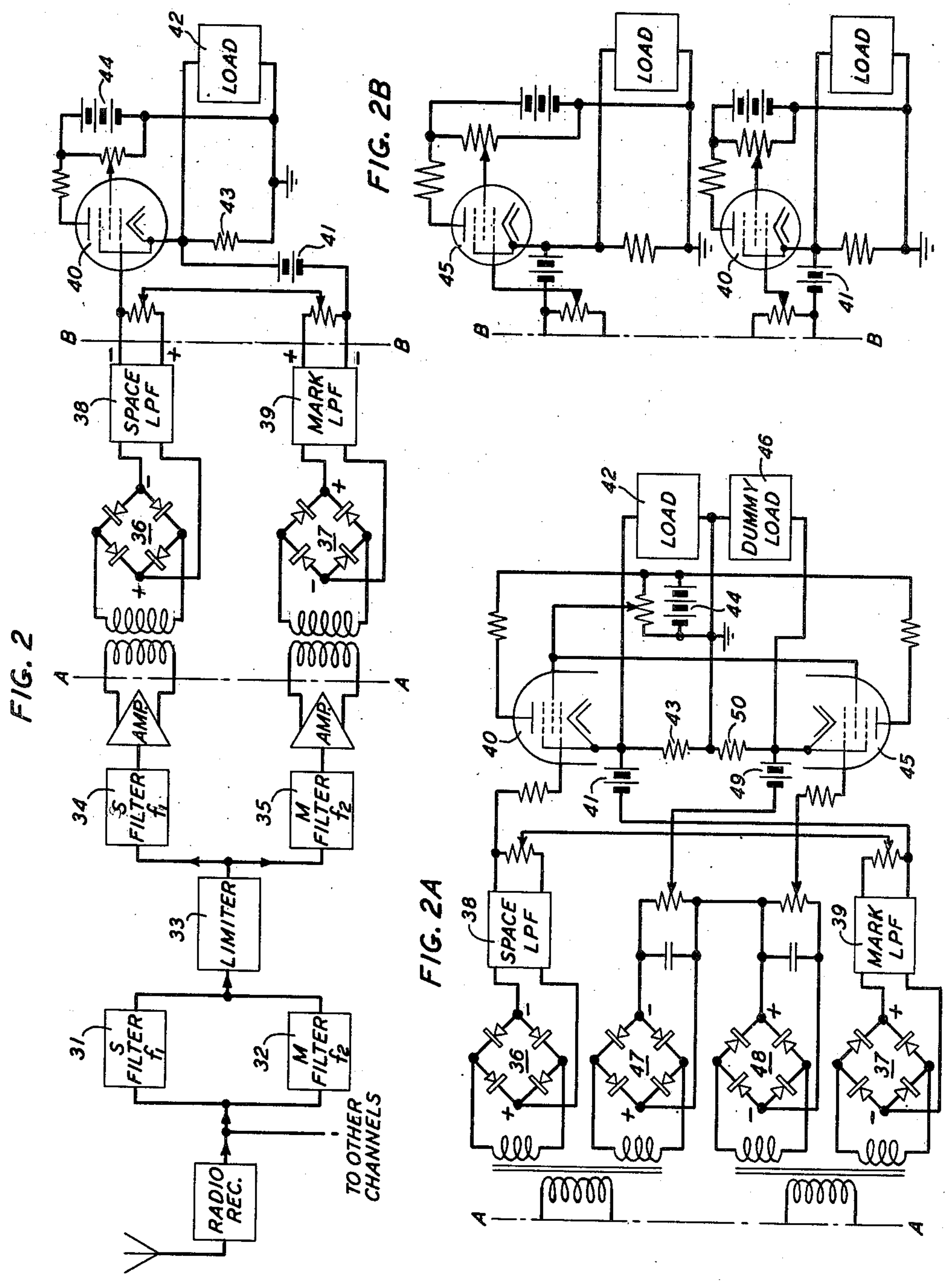

These and other features and objects of the invention may be better understood from a consideration of the following detailed description when read in accordance with the attached drawings in which:

Fig. 1 shows transmitting circuits for sending two-tone carrier signals, and Fig. 1A shows a modification of the transmitting equipment for single-tone operation; and Figs. 2 and 2A show receiving circuits for converting two-tone signals into a neutral or on-off signal output, and Fig. 2B shows a modification of the receiving equipment for single-tone operation.

Referring now to Fig. 1, a sending device 11 is connected in a loop with a spacing signal modulator 12 and a marking signal modulator 13. Each of the modulators has a variable loss network interposed between their respective oscillators 14 and 15 and output transformers 16 and 17. For example, the variable loss network connected between the spacing oscillator 14 and the spacing signal output transformer 16 comprises series varistor elements 28 and shunt varistor elements 27. Varistors are asymmetrically conducting devices and present a low impedance to positive currents flowing through them in the forward direction, i. e. the direction of the arrowhead which comprises a portion of their schematic representation and a high impedance to positive currents flowing through them in the opposite direction, viz. the backward direction. Direct current in the nature of a bias may be made to flow through such devices in a well-known manner to give them either a high or a low impedance to input alternating currents.

A current to control the impedance of the series and shunt elements of the spacing and marking modulators is injected into the loop by the sending device 11. The varistor elements of each modulator are so poled that for control current flowing in one direction the resistance of the series elements is low and that of the shunt elements is high resulting in a low-loss network, while for control current flowing in the other direction the resistance of the series elements is high and that of the shunt elements is low resulting in a high-loss network. Control current is supplied by the sending device 11 which comprises the bridge 18 shunted by the battery 19 and having a key 20 in one of its arms. The resistors of the bridge are so proportioned that when the key 20 is closed, terminal *a* of the bridge is positive with respect to terminal *b* and when the key is open, the bridge becomes unbalanced in the opposite direction so that terminal *b* becomes positive with respect to terminal *a*.

The spacing and marking modulators are interconnected so that the same control current flows through both networks. However, the control circuits of the two networks are connected in series opposition so that the loss of one network will be high when the loss of the other is low. For example, when key 20 is closed so that terminal *a* is positive with respect to terminal *b*, positive control current will flow out of terminal *a* into the marking modulator 13, through the series varistors 21 in the forward direction and the shunt varistors 22 in the backward direction to the center of the primary winding of transformer 17, and over lead 23 to the center of the primary winding of transformer 16 in the spacing modulator. From the center of the primary winding of transformer 16 the current will flow through the shunt varistors 29 in the forward direction and the series varistors 28 in the backward direction to terminal *b* of the bridge. Therefore, when the key 20 is closed, the series varistors 21 of the marking modulator and the shunt varistors 29 of the spacing modulator are in their low impedance condition and the series elements 28 of the spacing modulator and the shunt elements 22 of the marking modulator are in their high impedance condition so that a low loss is interposed between the marking oscillator 15, and output transformer 17 and a high loss is interposed between spacing oscillator 14 and output transformer 16 and a marking signal will be sent. When the key 20 is open, positive control current will flow in the forward direction through the series elements 28 of the spacing modulator and through the shunt elements 22 of the marking oscillator so that a spacing signal will be sent.

Since the varistor networks are balanced and terminated in transformers, and since the control signals are fed into the mid-branches of the networks, there is considerable attenuation due to the balance between the control and carrier paths of the networks. This balance is desirable in order to prevent harmonics of the input signals lying in the pass band of the output filter from reaching the carrier path and causing distortion of the output signals. The resistors 24 and 25 in the spacing modulator and resistors 26 and 27 in the marking modulator are proportioned to improve this balance.

At the receiver as shown in Fig. 2 the outputs of the receiving filters 31 and 32 which select the spacing and marking frequencies are connected to a common current limiter 33. The spacing and marking signals are again separated at the output of the limiter 33 by the filters 34 and 35 and after amplification are separately rectified by the rectifiers 36 and 37. The outputs of the spacing low-pass filter 38 and marking low-pass filter 39 are connected series opposing in the grid-cathode circuit of a direct-current amplifier 40. A sufficient negative bias is also provided in the grid-cathode circuit of tube 40 by the battery 41 so that in the absence of input signals, tube 40 will have half its normal marking current output. The load 42, which may, for example, be a relay operating in teletypewriter equipment, is connected across the cathode resistor 43 of the direct-current amplifier 40. Since the outputs of the marking and spacing filters are connected series opposing, a spacing signal will add to the negative bias provided by battery 41 and will cut the tube off so that no current will flow to the load 42. A marking signal, however, will oppose battery 41 and permit the output of tube 40 to rise to its full value.

If the current supplied by tube 40 during a marking signal is very high, the drain on the plate power supply 44 will be much greater than that for a spacing signal if no provision is made to stabilize this drain. The resulting exponential variation in the screen voltage supplied to the tube during marking signals may cause considerable distortion of the output signals. In order to prevent screen grid voltage variation the drain on the plate power supply may be stabilized as shown by the modification in Fig. 2A by connecting a tube 45 to draw the same amount of current from the common plate supply battery 44 during spacing signals as the tube 40 draws during marking signals. A dummy load 46 connected across the cathode resistor 50 of the tube 45 is adjusted to draw the same current during spacing signals as the load 42 does during marking signals. Auxiliary rectifiers 47 and 48 are connected, respectively, in the carrier paths of the spacing and marking signals and their outputs are connected together, series opposing, in a manner similar to the interconnections of the marking and spacing low-pass filters 38 and 39 respectively. They are, however, poled so that during a marking signal the output of the auxiliary rectifier 48 adds to the voltage supplied by battery 49 and holds tube 45 cut off. During spacing signals the output of auxiliary rectifier 47 opposes the voltage of battery 49 so that tube 45 will draw full current during spacing signals. There is, therefore, little voltage variation in the common plate power supply 44.

The sending and receiving circuits as shown in Figs. 1 and 2 may readily be converted into single-tone channels. For example, the sending circuit shown in Fig. 1 may be converted into two channels adapted for single-tone operation by removing the interconnections between the modulators and by connecting separate sending devices 51 and 52 to the separate modulators as shown in the modification of Fig. 1A. At the receiver it is necessary merely to remove the interconnections of the spacing and marking low-pass filters in Fig. 2A and to connect the output tubes 40 and 45 as separate direct-current amplifiers each of which supplies its own load as is illustrated by the modification shown in Fig. 2B.

Although the invention has been described in connection with specific embodiments, numerous other modifications and embodiments will readily occur to one skilled in the art without departing from the spirit of the invention.

What is claimed is:

1. A receiving circuit for carrier telegraph signals wherein marking and spacing signals are transmitted as waves of different frequencies, means for selectively receiving said marking signals, a first and a second rectifier, means to apply said marking and spacing signals to said first and second rectifiers, respectively, a first space discharge device having at least an anode, a control grid, and a cathode, means to connect the outputs of said first and second rectifiers in series opposing between the grid and cathode of said first space discharge device, a source of direct current connected between said anode and said cathode, and means to stabilize the voltage of said supply which comprises a third and a fourth rectifier, means to also apply said marking and spacing signals to said third and fourth rectifiers, respectively, a second space discharge device having at least an anode, a control electrode, and a cathode and also having said source connected between its anode and cathode, and means to connect the outputs of said third and fourth rectifiers in series opposing between the grid and cathode of said second space discharge device in a manner opposite to the connection of the outputs of said first and second rectifiers in the grid-cathode circuit of said first space discharge device.

2. The combination in accordance with claim 1 and biasing means connected in series with the outputs of said first and second and said third and fourth rectifiers, respectively.

3. A receiving circuit for a carrier telegraph system employing marking and spacing signals which comprises means for receiving and rectifying said signals, a source of direct current, a load, means responsive only to rectified signals of a first kind for applying current from said source to said load, a dummy load, and means responsive only to rectified signals of the other kind for applying current from said source to said dummy load.

4. A receiving circuit for a communication system employing marking and spacing signals which comprises means for receiving said signals, means for separately rectifying said signals, a pair of similar voltage-responsive load circuits having a common power supply, means for applying the rectified marking signals to said load circuits with opposite polarities, and means for applying the rectified spacing signals to said load circuits with polarities which oppose the said rectified marking signals also applied to said load circuits.

5. A receiving circuit for a carrier telegraph system employing marking and spacing signals which comprises means for receiving said signals, means for separately rectifying said marking and spacing signals, a first and a second space discharge device having a common power supply, a load circuit connected to the output of said first space discharge device, means for terminating the output of said second space discharge device in an impedance proportioned to draw substantially the same current from said power supply as is drawn by said load for similar input signals to said first and second space discharge devices, means for applying the rectified marking and spacing signals in mutually opposing relation to the input of said first space discharge device, and means for also applying the said rectified marking and spacing signals to the input of said second space discharge device in mutually opposing relation but respectively reversed with respect to the manner of their application to the input of said first space discharge device.

6. A receiving circuit for a carrier telegraph system employing marking and spacing signals which comprises means for receiving said signals, means for rectifying said signals, a first space discharge device having at least an anode, a cathode and a control grid, a source of direct-current potential connected in circuit with said anode and cathode, a load connected to respond to the current flow in said last-named circuit, means for applying the rectified marking signals between said grid and cathode with a first polarity, means for applying the rectified spacing signals between said grid and cathode with a second polarity, and means for stabilizing the drain on said source which comprises a second space discharge device similar to said first, means for also connecting said source in circuit with the anode and cathode of said second space discharge device, a dummy load connected to respond to the current flow in said last-named circuit, means for applying the rectified marking signals between the grid and cathode of said second device with said second polarity, and means for applying the rectified spacing signals between the grid and cathode of said second device with said first polarity.

THEODORE A. JONES.

References Cited in the file of this patent

UNITED STATES PATENTS

| Number | Name | Date |
|---|---|---|
| 2,498,680 | Hargreaves | Feb. 28, 1950 |